United States Patent
Tang et al.

(10) Patent No.: US 11,300,480 B2
(45) Date of Patent: Apr. 12, 2022

(54) ARTICULATED NON-DESTRUCTIVE TESTING DEVICE HAVING A PLURALITY OF ACTUATION SYSTEMS AND A METHOD OF ARTICULATING THE DEVICE

(71) Applicant: Baker Hughes Oilfield Operations LLC, Houston, TX (US)

(72) Inventors: Andrew Tang, Camillus, NY (US); James Delmonico, Baldwinsville, NY (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 64 days.

(21) Appl. No.: 16/805,690

(22) Filed: Feb. 28, 2020

(65) Prior Publication Data
US 2021/0270700 A1 Sep. 2, 2021

(51) Int. Cl.
*G01M 15/02* (2006.01)

(52) U.S. Cl.
CPC .................................. *G01M 15/02* (2013.01)

(58) Field of Classification Search
CPC .............................. G01M 15/02; G01M 15/14
See application file for complete search history.

(56) References Cited

U.S. PATENT DOCUMENTS

| | | | |
|---|---|---|---|
| 4,787,369 A | 11/1988 | Allred et al. | |
| 4,846,573 A | 7/1989 | Taylor et al. | |
| 7,682,307 B2 | 3/2010 | Danitz et al. | |
| 9,572,628 B2 | 2/2017 | Zubiate et al. | |
| 9,861,786 B2 | 1/2018 | Hinman et al. | |
| 2009/0143642 A1 | 6/2009 | Takahashi et al. | |
| 2017/0045550 A1* | 2/2017 | McGrath, Jr | G01R 31/2884 |
| 2017/0219814 A1* | 8/2017 | Letter | H04N 5/2251 |
| 2017/0219815 A1* | 8/2017 | Letter | H04N 5/232 |
| 2018/0296282 A1 | 10/2018 | Kose et al. | |
| 2018/0304458 A1 | 10/2018 | Takagi | |
| 2019/0129912 A1 | 5/2019 | Coombs et al. | |

FOREIGN PATENT DOCUMENTS

KR 10-2019-0083775 A 7/2019

OTHER PUBLICATIONS

International Search Report and Written Opinion issued in corresponding International Application No. PCT/US2021/018991, dated Jun. 10, 2021, 9 pages.
Wang, Mingfeng, et al., "Design and development of a slender dual-structure continuum robot for in-situ aeroengine repair." In2018 IEEE/RSJ International Conference on Intelligent Robots and Systems (IROS), pp. 5648-5653. IEEE, 2018.

* cited by examiner

*Primary Examiner* — Eric S. McCall
(74) *Attorney, Agent, or Firm* — Mintz Levin Cohn Ferris Glovsky and Popeo, PC; Lisa Adams (57) ABSTRACT

A non-destructive testing device includes a tubular housing including a proximal end and a distal end. A conduit section is arranged at the proximal end, and a bendable articulation section secured to the conduit section and arranged at the distal end. A plurality of actuation systems each includes a control cable extending along the tubular housing and arranged at a respective circumferential position within the bendable articulation section, and an actuator disposed at the proximal end of the tubular housing and secured to the control cable.

19 Claims, 6 Drawing Sheets

ARTICULATED NON-DESTRUCTIVE TESTING DEVICE HAVING A PLURALITY OF ACTUATION SYSTEMS AND A METHOD OF ARTICULATING THE DEVICE

BACKGROUND

Certain equipment and facilities, such as power generation equipment and facilities, oil and gas equipment and facilities, aircraft equipment and facilities, manufacturing equipment and facilities, and the like, include interrelated systems and processes. For example, power generation plants can include turbine systems and processes for operating and maintaining the turbine systems. Likewise, oil and gas operations can include carbonaceous fuel retrieval systems and processing equipment interconnected via pipelines. Similarly, aircraft systems can include airplanes and maintenance hangars useful in maintaining airworthiness and providing for maintenance support. During equipment operations, the equipment can degrade, encounter undesired conditions such as corrosion, wear and tear, etc., potentially affecting overall equipment effectiveness. Certain inspection techniques, such as non-destructive inspection techniques or non-destructive testing (NDT) techniques, can be used to detect undesired equipment conditions.

SUMMARY

Certain NDT devices can be used to observe the inner mechanisms of complex machines, such as turbines and oil and gas equipment. NDT devices (i.e., borescopes, endoscopes, etc.) can be fed through these complex machines to perform maintenance checks with dismantling the whole machine. Such NDT devices require the ability to be actuated in order to maneuver through the small openings of these complex machines. Therefore, it is beneficial to increase the maneuverability and accuracy of an NDT device.

In general, systems and methods are provided for controlling non-destructive testing devices.

In one embodiment, non-destructive testing devices can include a tubular housing and a plurality of actuation systems. The tubular housing can include a proximal end and a distal end, a conduit section arranged at the proximal end, and a bendable articulation section secured to the conduit section and arranged at the distal end. The each actuation system of the plurality of actuation systems can include a control cable extending along the tubular housing and arranged at a respective circumferential position within the bendable articulation section, and an actuator disposed at the proximal end of the tubular housing and secured to the control cable.

In another embodiment, each circumferential position of each control cable of the plurality of actuation systems can be substantially equally spaced apart circumferentially around the bendable articulation section.

In another embodiment, each actuator of the plurality of actuation systems can be configured to extend or retract the control cable secured to the actuator.

In another embodiment, each control cable of the plurality of actuation systems can be configured to be independently controlled.

In another embodiment, the plurality of actuation systems can include a first actuation system, a second actuation system, and a third actuation system.

In another embodiment, the bendable articulation section can be configured to bend when only the first actuation system is actuated.

In another embodiment, the bendable articulation section can be configured to bend when only the second actuation system and the third actuation system are actuated in the same direction.

In another embodiment, each control cable of the plurality of actuation systems can extend within channels formed between an outer wall and an inner wall of the bendable articulation section.

In another embodiment, each circumferential position of each control cable of the plurality of actuation systems can be unequally spaced apart circumferentially around the bendable articulation section.

In another embodiment, the bendable articulation section can be configured to articulate a substantially 360° angle about the conduit section.

In another embodiment, the non-destructive testing device can further include a head section coupled to the distal end of the tubular housing and a control unit housing coupled to the proximal end of the tubular housing.

In another embodiment, each actuator of the plurality of actuation systems can be arranged within the control unit housing.

Methods for articulating a non-destructive testing device are also provided. In one embodiment, a method can include receiving, by a control unit communicatively coupled to a plurality of actuation systems, an actuation command. Each of the plurality of actuation systems can include a control cable extending along a tubular housing and arranged at a respective circumferential position within the tubular housing, and an actuator disposed at the proximal end of the tubular housing and secured to the control cable. The plurality of actuation systems can be actuated based on the actuation command in order to bend a bendable articulation section of the tubular housing, wherein each actuation system is configured to be independently operable.

In another embodiment, each circumferential position of each control cable of the plurality of actuation systems can be substantially equally spaced apart circumferentially around the bendable articulation section.

In another embodiment, each actuator of the plurality of actuation systems can be configured to extend or retract the control cable secured to the actuator.

In another embodiment, each actuator of the plurality of actuation systems can include a force sensor configured to measure the tension of each control cable.

In another embodiment, each control cable can be extended or retracted based on the tension of each control cable of the plurality of actuation systems.

In another embodiment, the plurality of actuation systems can include a first actuation system, a second actuation system, and a third actuation system.

In another embodiment, the method of articulating a non-destructive testing device can further include actuating the first actuation system to apply tension to a first control cable bends the bendable articulation section in a first direction, and actuating the second actuation system and the third actuation system to apply tension to a second control cable and a third control cable bends the bendable articulation section in a second direction, opposite the first direction.

In another embodiment, the bendable articulation section can be configured to articulate a substantially 360° angle about the conduit section.

BRIEF DESCRIPTION OF THE DRAWINGS

A brief description of each drawing is provided to more sufficiently understand drawings used in the detailed description of the present disclosure.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

Non-destructive testing systems and devices can be used to inspect a variety of equipment and facilities without destroying the systems and/or devices being inspected. As an example, the NDT systems and devices can include cameras and other measurement devices to obtain images and data of the equipment and facilities as well as inside the equipment and facilities. In use, the measurement devices and cameras that can be inserted into various locations in or around the equipment and facilities. The measurement devices and cameras can remotely couple to other devices that an operator can use to view the data gathered by the measurement device and camera as well as control the measurement device and camera. In embodiments, buttons, a joystick, and/or relative control gestures on a touchscreen associated with the NDT system or device, can be used to control a positioning of the imaging device in an asset (e.g., to move the imaging device from a first position to a second position).

In order to actuate the NDT system, various positioning systems can be used which can bend a distal end of the NDT system to varying degrees of articulation. For example, a plurality of cables can extend along the length of the NDT system and be actuated by various motors arranged at a proximal end of the NDT system. However, some cable systems can be actuated in such a way which allows for slack to be introduced into cables of the NDT system, causing a decrease in accuracy and performance of the NDT system. It is common, for example, that during inspection of machinery the NDT equipment's insertion tube is greatly undulated. When undulated it takes greater force to articulate the end of the instrument due to friction, which results in greater cable slack in all typical 4-wire steering embodiments. This type of slack is partially from elastic cable stretch and elastic insertion tube compression, which degrades the responsiveness of the NDT system's articulation, but is not permanent as the system will rebound when the cables are relaxed. In addition, normal wear over the life of the NDT system can introduce cable slack as the cables inelastically stretch and the insertion tube inelastically compresses among other wear effects. In embodiments of the current subject matter, each control cable is coupled to a separate actuator which can be actuated separately. Since each control cable is separately controllable, each control cable can be under tension simultaneously, which allows for greater control of the NDT device. Additionally, since tension is maintained on the control cables at all times, the NDT system can inherently compensate for normal wear and deliver consistent performance over the service life of the system. The invention can also inherently compensate for cable slack caused by a greatly undulated insertion tube while in use to compensate for previously mentioned elastic effects in the system. The benefit of this invention increases the longer a system's insertion tube is, since longer insertion tubes can for example experience greater inelastic cable stretch and greater insertion tube compression.

Figure 1:
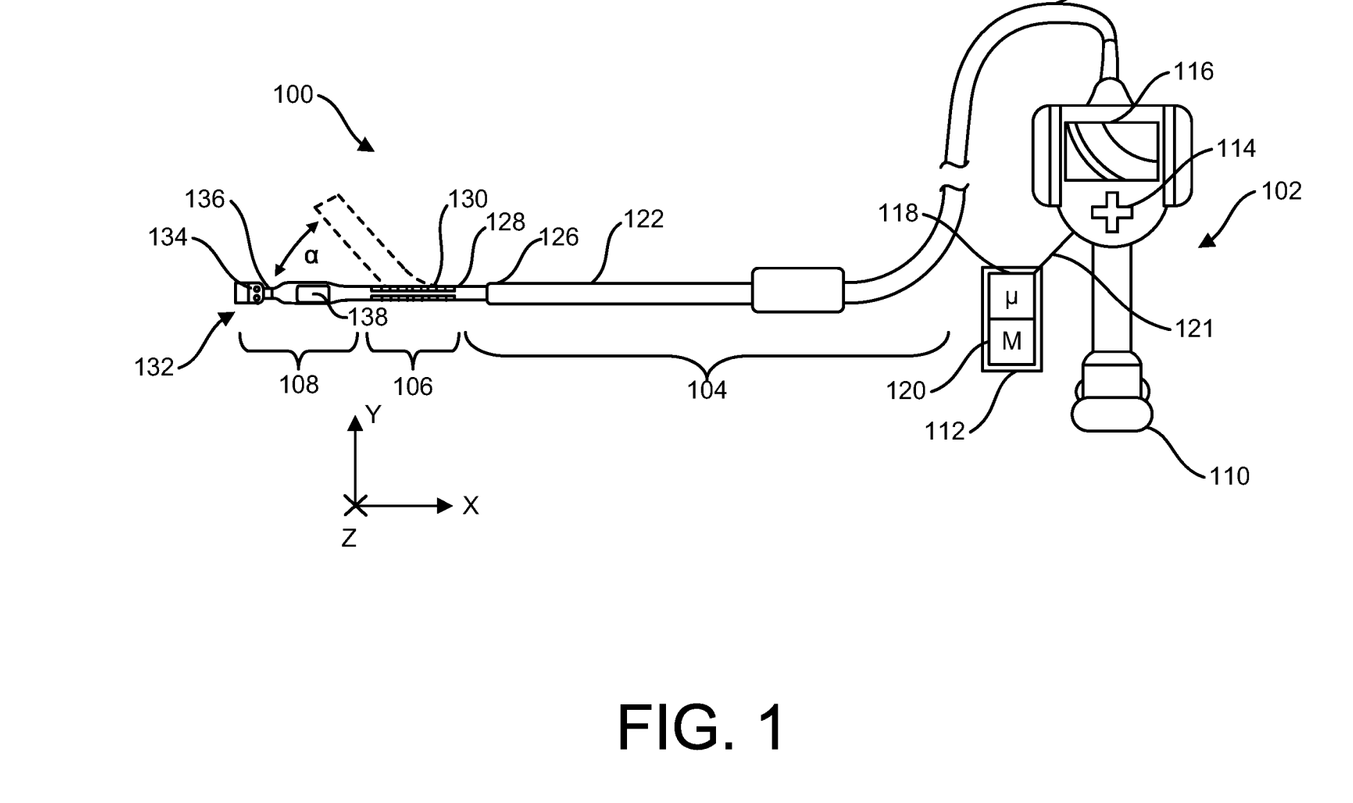
FIG. 1 is a schematic illustration of one exemplary embodiment of a non-destructive testing (NDT) device.

Referring now to FIG. 1, a schematic illustration of an NDT device 100 is generally depicted. NDT device 100 includes a control unit 102, a conduit section 104, a bendable articulation section 106, and a head section 108. Each of the sections 104, 106, and 108 can be integral with one another, or can be removable detachable from each section depending on specific applications. For example, if a longer conduit section 104 is required, the shorter conduit section 104 can be removed and a longer conduit section 104 can be attached to the control unit 102. As depicted, the conduit section 104 is suitable for insertion into a variety of locations, such as inside turbomachinery, equipment, pipes, conduits, underwater locations, curves, bends, inside or outside of an aircraft system, and the like.

Referring still to FIG. 1, the control unit 102 includes a control unit housing 110, a controller 112, a directional input 114, and a screen 116. The controller 112 can include a processor 118 and a readable memory 120 containing computer readable instructions which can be executed by the processor 118 in order to actuate the NDT device 100. The controller 112 is communicatively coupled to the control unit 102 via a signal 121. In embodiments, the controller 112 can be arranged within the control unit housing 110, or can be arranged outside the control unit housing 110. The directional input 114 is for a user to input direction controls to the control unit 102 in order to actuate the NDT device 100. The screen 116 can display visual information being received by an optical sensor arranged in the head section 108, which allows the user to better guide the NDT device 100 using the directional input 114. In embodiments, the directional input 114 and the screen 116 are communicatively coupled to the controller 112 via signal 121, which can be a hard-wired connection or a wireless signal, such as WI-FI™ or Bluetooth™.

Referring still to FIG. 1, the conduit section 104 includes a tubular housing 122 including a proximal end 124 and a distal end 126. In embodiments, the control unit 102 is arranged at the proximal end 124 of the tubular housing 122, and the bendable articulation section 106 is arranged at the distal end of the tubular housing 122. The tubular housing 122 can be a flexible member along its whole length, or can be rigid at the proximal end 124 and become more flexible travelling down the length of the conduit section 104 towards the distal end 126. Additionally, in embodiments, the tubular housing 122 can be formed from a non-porous material to prevent contaminants from entering the NDT device 100 via the conduit section 104.

Referring still to FIG. 1, the bendable articulation section 106 includes a bendable neck 128 and washers 130. The bendable neck 128 is arranged at the distal end 126 of the tubular housing 122, and is able to be actuated 360° in the Y-Z plane. In embodiments, the washers 130 can be wobble washers, which allow the washers 130 to slide against one another as the bendable neck 128 is articulated, keeping the shape of the bendable articulation section 106. The washers 130 can be copper or some other suitable rigid material, and have angled surfaces which allow for the bendable neck 128 to be articulated. The bendable neck 128 can be wrapped in a non-porous material to prevent contaminants from entering the NDT device 100 via the bendable articulation section 106, and specifically between the washers 130 during articulation of the bendable neck 128.

Referring still to FIG. 1, the head section 108 includes a head assembly 132. The head assembly 132 includes one or more lights 134 (e.g., LEDs or a fiber optic bundle with lights at the proximal end), a camera 136, and one or more of a sensor 138. In general, the head section 108 includes one or more sensors that collect data about the surrounding environment (e.g., a sensor 138, a camera 136, etc.).

As mentioned above, the camera 136 of the NDT device 100 can provide images and video suitable for inspection to the screen 116 of the control unit 102. The lights 134 can be used to provide for illumination when the head section 108 is disposed in locations having low light or no light. The sensor 138 can record data including temperature data, distance data, clearance data (e.g., distance between a rotating element and a stationary element), flow data, and so on. In certain embodiments, the NDT device 100 includes a plurality of replacement head assemblies 132. For example, the head assemblies 132 can include retrieval tips such as snares, magnetic tips, gripper tips, and the like. The head assemblies 132 can additionally include cleaning and obstruction removal tools, such as wire brushes, wire cutters, and the like. The head assemblies 132 can additionally include tips having differing optical characteristics, such as focal length, stereoscopic views, 3-dimensional (3D) phase views, shadow views, and so on. Additionally or alternatively, the head section 108 includes a removable and replaceable portion of the head section 108. Accordingly, a plurality of the head sections 108, bendable necks 128, and conduit sections 104 can be provided at a variety of diameters from approximately one millimeter to ten millimeters or more.

During use, the bendable articulation section 106 can be controlled, for example, by the control inputs (e.g., relative control gestures, physical manipulation device) from the directional input 114. The directional input can be a joystick, D-pad, touch pad, trackball, optical sensor, or a touchscreen over the screen 116. The directional input 114 can also be a similar device that is located outside the control unit housing 110 and connected by wire or wireless means. In particular, a set of control inputs can be used to control the bendable articulation section 106. The bendable articulation section 106 can steer or "bend" in various dimensions, and can use actuators and wires, or a combination thereof, arranged within the control unit 102, to adjust the orientation (e.g., a positioning) of the head section 108. The actuators can be electric, pneumatic, or ultrasonically operated motors or solenoids, shape alloy, electroactive polymers, dielectric elastomers, polymer muscle material, or other materials. For example, the bendable articulation section 106 can enable movement of the head section 108 in an X-Y plane, X-Z plane, and/or Y-Z plane. Indeed, the directional input 114 can be used to perform control actions suitable for disposing the head section 108 at a variety of angles, such as the depicted angle α. In this manner, the head section 108 can be positioned to visually inspect desired locations. Once the head section 108 is in a desired position, the camera 136 can operate to capture, for example, a stand-still visual image or a continuous visual image, which can be displayed on the screen 116 of the control unit 102, and can be recorded by the NDT device 100. In embodiments, the screen 116 can be multi-touch touch screens using capacitance techniques, resistive techniques, infrared grid techniques, and the like, to detect the touch of a stylus and/or one or more human fingers. Additionally or alternatively, captured visual images can be transmitted into a separate storage device for later reference.

Figure 2A:
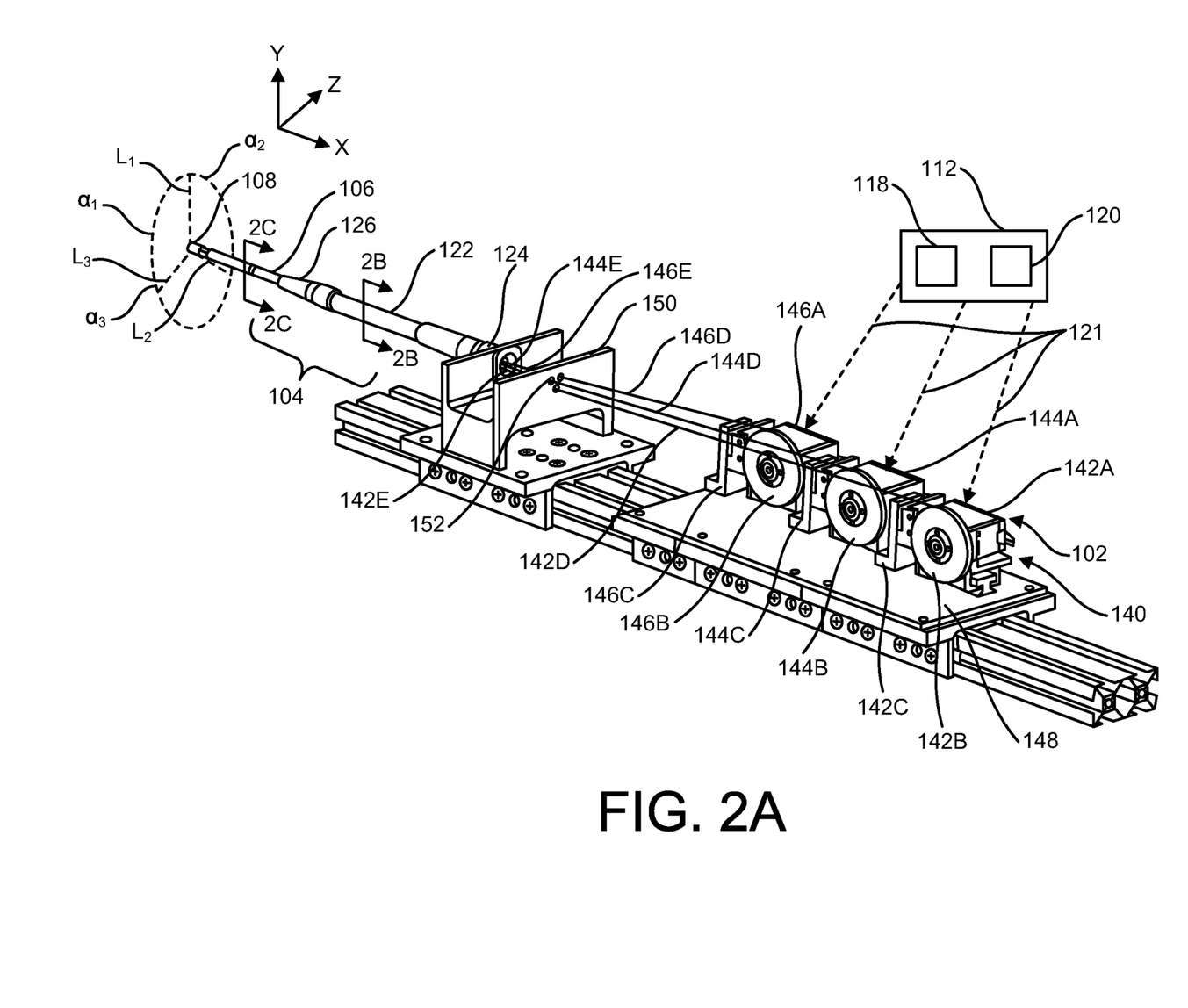
FIG. 2A is a perspective schematic illustration of the NDT device of FIG. 1.

Referring now to FIG. 2A, a perspective view of the NDT device 100 is depicted without the control unit housing 110. The control unit 102 includes a plurality of actuation systems 140 arranged with in the control unit housing 110. Each actuation system of the plurality of actuation systems 140 includes a control cable extending along the tubular housing 122 and arranged at a respective circumferential position within the tubular housing 122, and an actuator disposed at the proximal end 124 of the tubular housing 122 and secured to the control cable. For example and as depicted, the plurality of actuation systems 140 include actuators 142A, 144A, and 146A.

Still referring to FIG. 2A, the actuator 142A includes a rotor 142B, a force sensor 142C, and a control cable 142D. The actuator 142A is mounted to the force sensor 142C such that when a tension is imparted to the control cable 142D, the tension in the control cable 142D can be measured by the force sensor 142C. The rotor 142B is non-rotatably connected to the actuator 142A. When the actuator 142A receives a control signal 121 from the controller 112, the rotor 142B is rotated by the actuator 142A. Additionally, the control cable 142D is secured to the rotor 142B such that when the rotor 142B rotates, the control cable 142D is extended or retracted by either being unwound or spooled onto the rotor 142B, respectively. The control cables 142D, 144D, and 146D are secured to the bendable articulation section 106 such that when at least one control cable is either extended or retracted, the bendable articulation section 106 is articulated to some degree.

Still referring to FIG. 2A, the actuator 144A includes a rotor 144B, a force sensor 144C, and a control cable 144D. The actuator 144A is mounted to the force sensor 144C such that when a tension is imparted to the control cable 144D, the tension in the control cable 144D can be measured by the force sensor 144C. The rotor 144B is non-rotatably connected to the actuator 144A such that when the actuator 144A receives a control signal 121 from the controller 112, the rotor 144B is rotated by the actuator 144A. Additionally, the control cable 144D is secured to the rotor 144B such that when the rotor 144B is rotates, the control cable 144D is extended or retracted by either being unwound or spooled onto the rotor 144B, respectively.

Still referring to FIG. 2A, the actuator 146A includes a rotor 146B, a force sensor 146C, and a control cable 146D. The actuator 146A is mounted to the force sensor 146C such that when a tension is imparted to the control cable 146D, the tension in the control cable 146D can be measured by the force sensor 142C. The rotor 146B is non-rotatably connected to the actuator 146A such that when the actuator 146A receives a control signal 121 from the controller 112, the rotor 146B is rotated by the actuator 146A. Additionally, the control cable 146D is secured to the rotor 146B such that when the rotor 146B is rotates, the control cable 146D is extended or retracted by either being unwound or spooled onto the rotor 146B, respectively.

Still referring to FIG. 2A, each actuator 142A, 144A, and 146A can be independently controlled with respect to one another. This allows for each individual control cable 142D, 144D, and 146D to be independently controlled (i.e., extended or retracted) in order to actuate the bendable articulation section 106 of the NDT device 100. Each control cable 142D, 144D, and 146D enters the tubular housing 122 at the proximal end 124 and is supported by a guide 150 having apertures 152 arranged therein. In embodiments, the bendable articulation section 106 is bent along lines $L_1$, $L_2$, and $L_3$ when only a single actuator 142A, 144A, and 146A is actuated to either extend or retract a corresponding control cable 142D, 144D, and 146D. Additionally, if a combination of actuators 142A, 144A, and 146A are actuated, then the bendable articulation section 106 can bend along angles $\alpha_1$, $\alpha_2$, and $\alpha_3$. This allows for the bendable articulation section to achieve 360° articulation in the Y-Z plane with only three actuation systems 140. Since each actuation system 140 is secured to a single control cable, no lag or additional slack is introduced into the system during articulation of the bendable articulation section 106. This allows for greater control and accuracy of the NDT device 100 compared to device which introduce slack into the control cables during articulation.

Figure 2B:
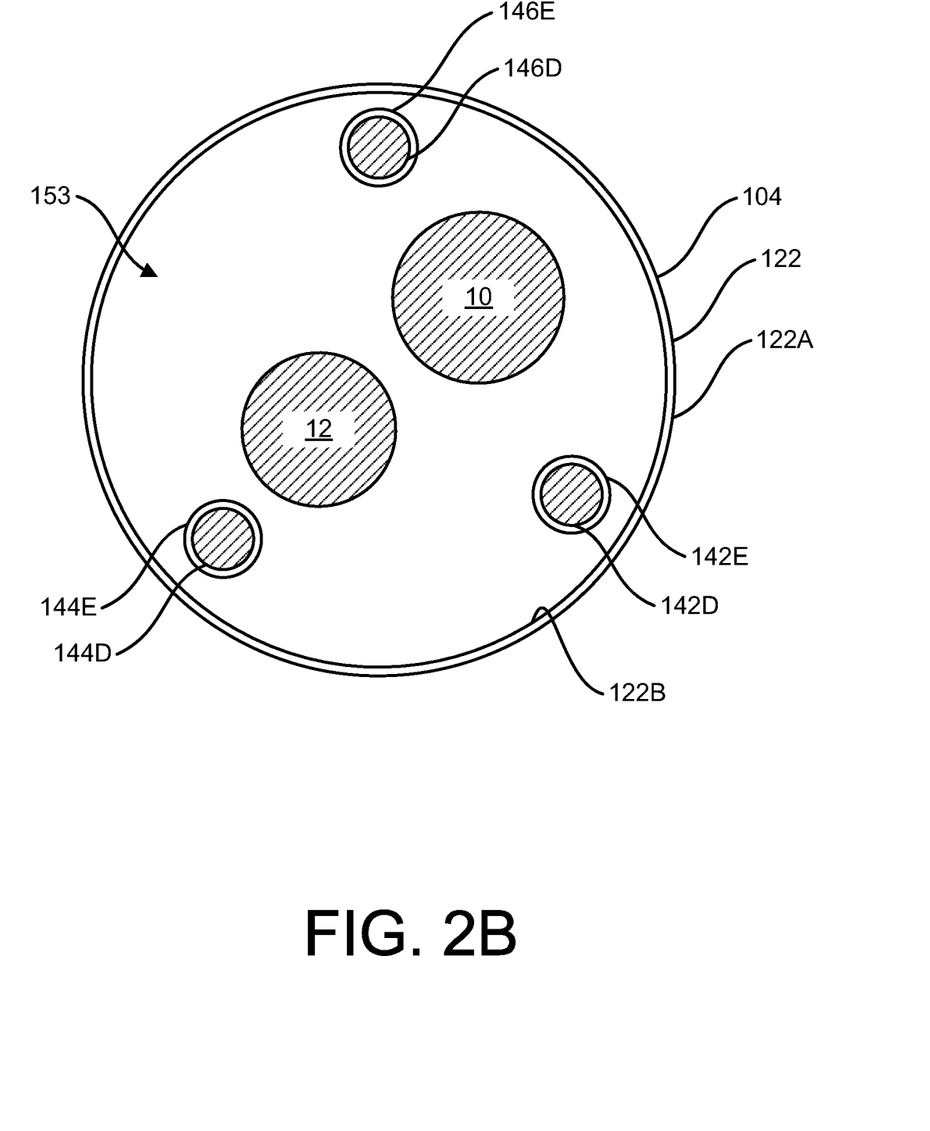
FIG. 2B is a cross-sectional schematic illustration of the NDT device of FIG. 2A taken generally along line 2B-2B in FIG. 2A

Referring now to FIG. 2B, a cross-sectional schematic illustration of the conduit section 104 (as shown in FIG. 1) of the NDT device 100 taken generally along line 2B-2B in FIG. 2A is depicted. As depicted, the control cables 142D, 144D, and 146D pass through sheaths 142E, 144E, and 146E along the length of the conduit section 104 within the tubular housing 122. The sheaths 142E, 144E, and 146E can be secured to the guide 150 and the first washer 130 of the bendable neck 128, but not secured to the inner wall 122B. A working volume 153 is arranged within the inner wall 122B of the tubular housing 122. The outer wall 122A of the tubular housing 122 protects the internal components of the tubular housing 122. In embodiments, various objects, such as electrical cables 10 or optical fibers 12, may also be arranged within the working volume 153 along the length of the tubular housing 122. The sheaths 142E, 144E, and 146E can prevent wear against the electrical cables 10 or optical fibers 12 as the control cables 142D, 144D, and 146D are actuated to bend the bendable neck 128.

Figure 2C:
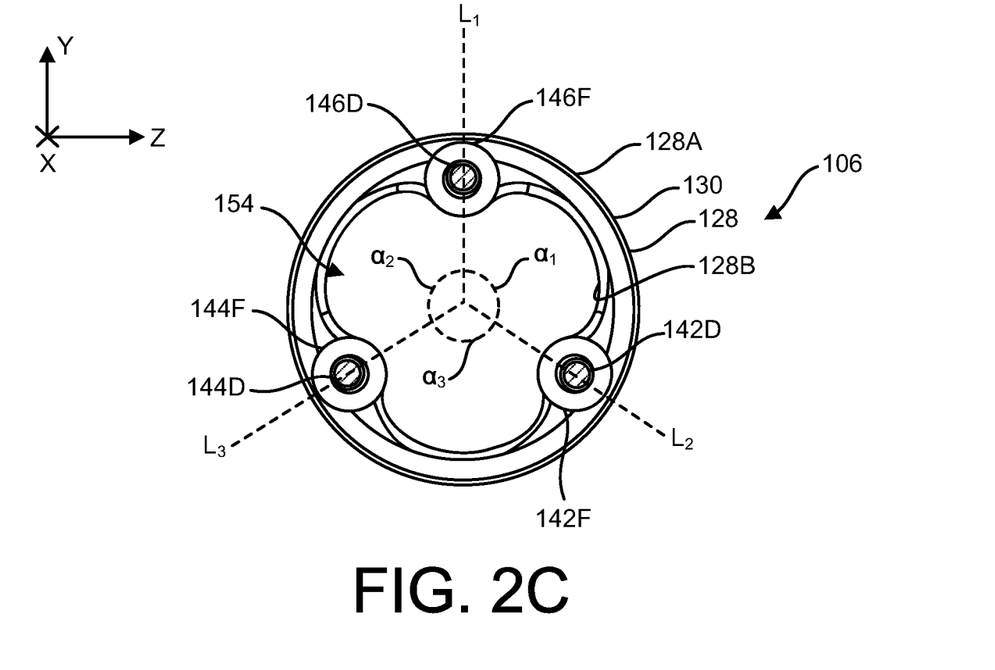
FIG. 2C is a cross-sectional schematic illustration of the NDT device of FIG. 2A taken generally along line 2C-2C in FIG. 2A.

Referring now to FIG. 2C, a cross-sectional schematic illustration of the bendable articulation section 106 (as shown in FIG. 1) of the NDT device 100 taken generally along line 2C-2C in FIG. 2A is depicted. As depicted, the control cables 142D, 144D, and 146D pass through a stack of washers 130 having channels 142F, 144F, and 146F, respectively, stacked within the outer wall 128A of the bendable neck 128. In embodiments, each channel 142F, 144F, and 146F, and therefore corresponding control cable 142D, 144D, and 146D, is arranged at a circumferential position within the bendable neck 128. The circumferential positions of the control cables 142D, 144D, and 146D can be substantially equally spaced apart circumferentially around the bendable neck 128. A working volume 154 is arranged within the bendable neck 128 and bound by the inner wall 122B of the wobble washers. The working volume can extend the whole length of the bendable articulation section 106 and the conduit section 104 (as shown in FIG. 1) to allow tools and devices 10, 12 (as shown in FIG. 2A) to pass through the bendable neck 128 and the tubular housing 122 from the proximal end 124 to the distal end 126, through the bendable articulation section 106, and through the head section 108. In embodiments where only three control cables 142D, 144D, and 146D are required to actuate the bendable articulation section 106, a larger working volume 154 is present within the tubular housing 122 and bending neck 128 when compared to an embodiment requiring four control cables, as shown in FIG. 3B.

Still referring to FIG. 2C, when only the control cable 146D is retracted by the actuator 146A, and the control cables 142D and 144D are kept in tension, the bendable articulation section 106 will bend along line $L_1$. When only the control cable 144D is retracted by the actuator 144A, and the control cables 142D and 146D are kept in tension, the bendable articulation section 106 will bend along line $L_3$. When only the control cable 142D is retracted by the actuator 142A, and the control cables 144D and 146D are kept in tension, the bendable articulation section 106 will bend along line $L_2$. When only the control cables 142D and 144D are retracted by the actuators 142A and 144A, respectively, and the control cable 146D is kept in tension, the bendable articulation section 106 will bend 180° opposite line $L_1$.

In embodiments, when the bendable articulation section 106 is articulated, the controller 112 receives the force measurements from each force sensor 142C, 144C, and 146C. As a control cable 142D, 144D, or 146D is retracted in order to bend the bendable articulation section 106, the control cables not being retracted can be extended to aid in the articulation. During an articulation, the tension in a control cable being retracted can be in a range of 10-50 lbf, and in a preferable range of 20-42 lbf, while the tension in a control cable being extended can be in a range of 0-5 lbf, and in a preferable range of 0.5-1 lbf. The control cables 142D, 144D, and 146D can be made of stainless steel, tungsten, or another suitable material. Additionally, the control cables 142D, 144D, and 146D can have a length in a range of 1-100 ft, and have a diameter of 0.014 in.

Figure 2D:
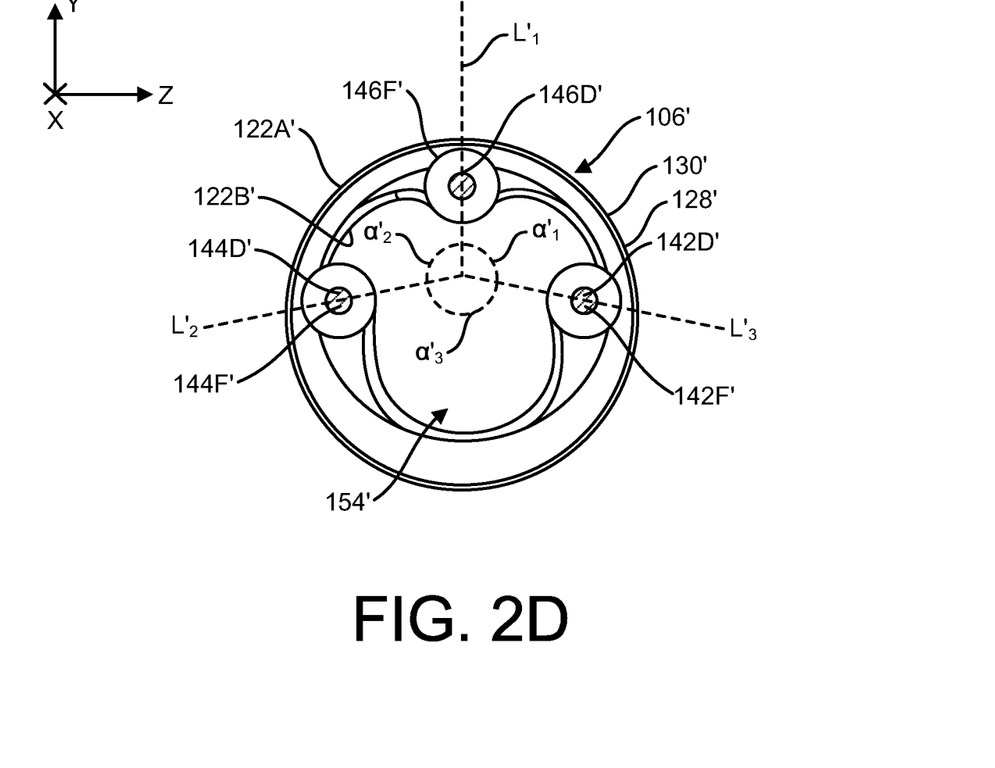
FIG. 2D is a cross-sectional schematic illustration of one exemplary embodiment of a NDT device.

Referring now to FIG. 2D, a cross-section schematic illustration of a conduit section 104' is depicted. It should be noted that conduit section 104' is similar to the conduit section 104 depicted in FIG. 2C, except for the circumferential locations of channels 142F', 144F', and 146F'. The bendable articulation section 106' includes channels 142F', 144F', and 146F' which are not equally spaced apart circumferentially around the bendable neck 128'. The channels 142F', 144F', and 146F' are spaced apart asymmetrically, where $\alpha_1'$ is equal to $\alpha_2'$, but $\alpha_3'$ is larger than $\alpha_1'$ and $\alpha_2'$. This arrangement allows for a differently shaped working volume 154', where the portion of the working volume 154' bound by $\alpha_3'$ is larger than the portion of the working volume 154' bound by $\alpha_3$ in FIG. 2B. This allows for a larger tool or device to be fed through the bendable neck 128' when compared to the bendable neck 128. The larger working volume 154' can also be used for additional electrical cables 10 or optical fibers 12 to improve capability and performance of the product.

Figure 3A:
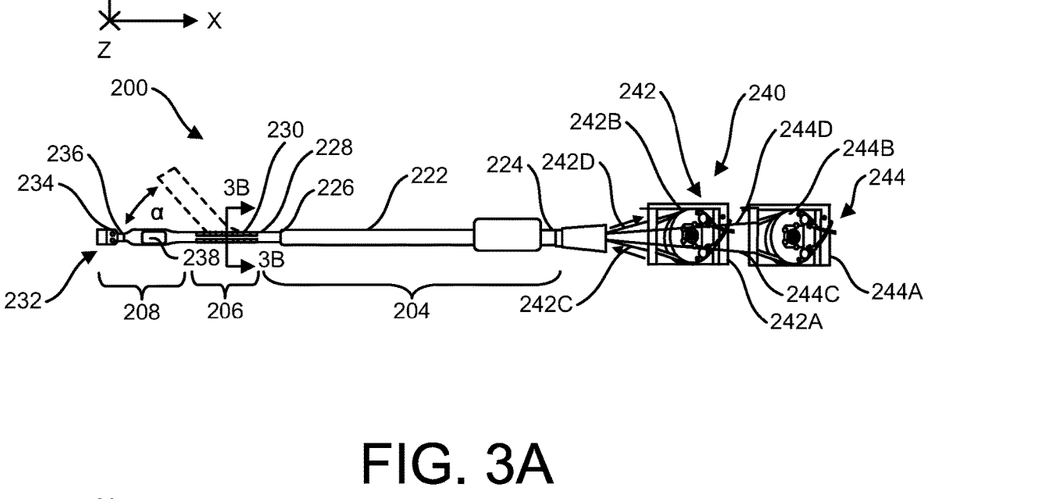
FIG. 3A is a schematic illustration of one exemplary embodiment of a NDT device.
Figure 3B:
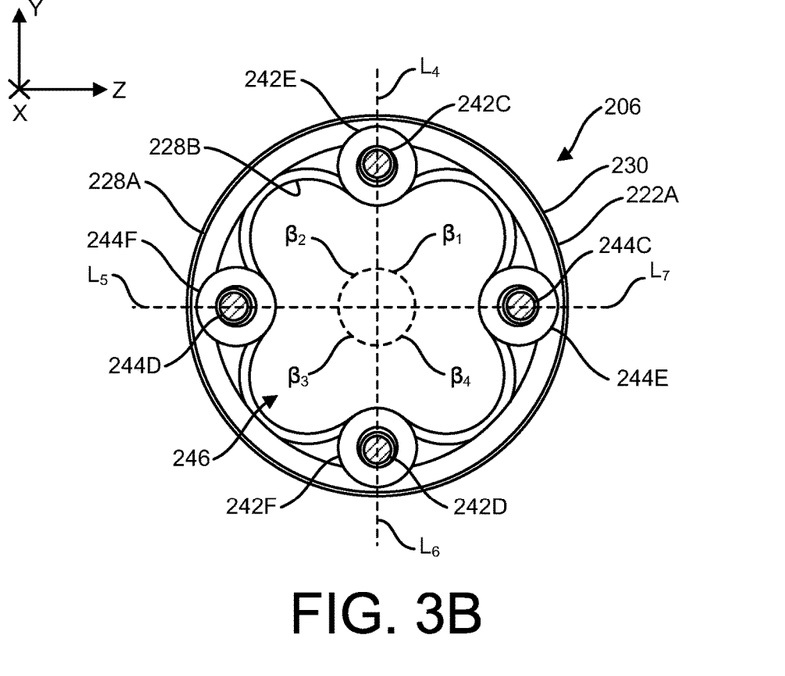
FIG. 3B is a cross-sectional schematic illustration of the NDT device of FIG. 3A taken generally along line 3B-3B in FIG. 3A.

Now referring to FIG. 3A, a schematic illustration of a NDT device 200 is depicted. It should be noted that NDT device 200 is similar to the NDT device 100 depicted in FIG. 1, except for the plurality of actuation systems 240 and control cables. The NDT device 200 includes a conduit section 204, a bendable articulation section 206, and a head section 208. The conduit section includes a tubular housing 222 extending from a proximal end 224 to a distal end 226. The bendable articulation section 206 includes a bendable neck 228 and washers 230. The head section 208 includes a head assembly 232, which includes lights 234, camera 236, and sensor 238. A plurality of actuation systems 240 is arranged to actuate control cables in order to articulate the bendable neck 228. Articulation assembly 242 includes actuator 242A, rotor 242B, control cable 242C, and control cable 242D. Articulation assembly 244 includes actuator 244A, rotor 244B, control cable 244C, and control cable 244D. The arrangement of having a single rotor 242B, 244B control two separate control cables 242C, 242D, and 244C, 244D simultaneously introduces slack into the system. For example, as the rotor 242B rotates clockwise, control cable 242D will be in tension, while control cable 242C slackens due to a loss of tension. This reduces accuracy and reaction time of the NDT device 200, and can contribute to decreased device life expectancy due to the system's inability to take up control cable slack as it develops over time.

Referring now to FIG. 3B, a cross-sectional schematic illustration of the bendable articulation section 206 taken along line 3B-3B in FIG. 3A is depicted. Control cables 242C, 242D, 244C, and 244D extend within the tubular housing 222 along the conduit section 204 and the bendable articulation section 206, and through channels 242E, 242F, 244E, and 244F formed within washer 230, stacked within the outer wall 222A of the bendable neck 228. Due to the diametric configuration of the control cables 242C, 242D, 244C, and 244D, the bendable articulation section 206 is articulated in a single direction along lines $L_4$, $L_5$, $L_6$, or $L_7$ by applying tension to a single control cable and slackening the control cable directly opposite the tensioned control cable. In order to articulate the bendable articulation section 206 along angles $\beta_1$, $\beta_2$, $\beta_3$, or $\beta_4$, at least two control cables must be tensioned, with the remaining two control cables slackened to accommodate for the additional tension.

Figure 4:
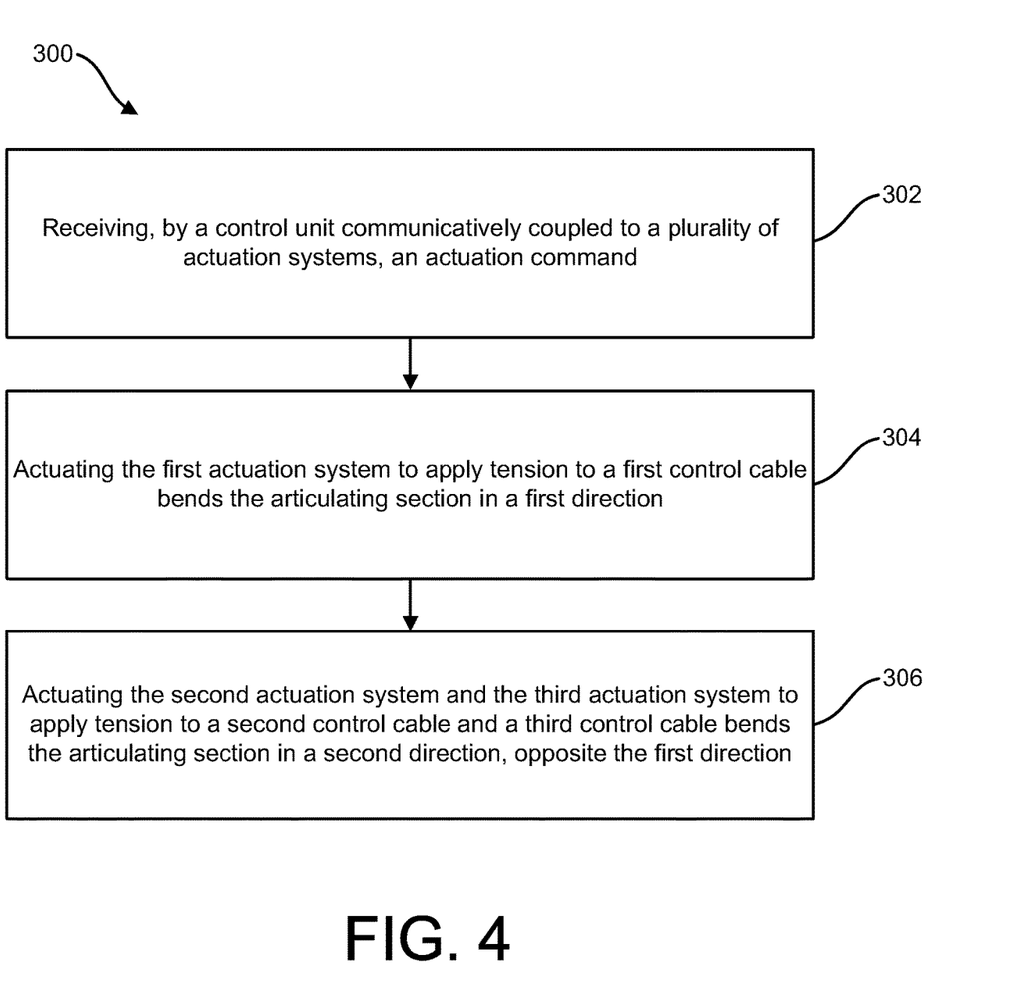
FIG. 4 is an exemplary embodiment of a method of actuating the NDT device of FIGS. 1-2C.

Referring now to FIG. 4, a method 300 of articulating a non-destructive testing device is depicted. At step 302, a control unit communicatively coupled to a plurality of actuation systems receives an actuation command. The directional input 114 of the control unit 102 can be used to generate an actuation command which is then translated to the plurality of actuation system 140. At step 304, the first actuation system is actuated to apply tension to a first control cable to bend the bendable articulation section in a first direction. As stated above, when only the control cable 146D is retracted by the actuator 146A, and the control cables 142D and 144D are extended by actuators 142A and 144A, respectively, to relieve tension, the bendable articulation section 106 will bend along line $L_1$. In embodiments, the distance which control cable 146D is retracted is substantially equal to the distance that control cables 142D and 144D are extended. At step 306, the second actuation system and the third actuation system are actuated to apply tension to a second control cable and a third control cable to bend the articulating section in a second direction, opposite the first direction. As stated above, when only the control cables 142D and 144D are retracted by the actuators 142A and 144A, respectively, and the control cable 146D is extended by actuator 146A to relieve tension, the bendable articulation section 106 will bend 180° opposite line $L_1$. Each actuation system of the plurality of actuation system 140 is configured to be independently operable.

As set forth herein, a NDT device according to exemplary embodiments of the present disclosure includes a tubular housing including a proximal end and a distal end. A conduit section is arranged at the proximal end, and a bendable articulation section secured to the conduit section and arranged at the distal end. A plurality of actuation systems each includes a control cable extending along the tubular housing and arranged at a respective circumferential position within the bendable neck of the tubular housing, and an actuator disposed at the proximal end of the tubular housing and secured to the control cable. Applications for the present disclosure include use in a borescope, endoscope, or the like for NDT purposes.

The present disclosure is not limited to the exemplary embodiments described herein and can be embodied in variations and modifications. The exemplary embodiments are provided merely to allow one of ordinary skill in the art to understand the scope of the present disclosure, which will be defined by the scope of the claims. Accordingly, in some embodiments, well-known operations of a process, well-known structures, and well-known technologies are not be described in detail to avoid obscure understanding of the present disclosure. Throughout the specification, same reference numerals refer to same elements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinabove, although the present disclosure is described by specific matters such as concrete components, and the like, the exemplary embodiments, and drawings, they are provided merely for assisting in the entire understanding of the present disclosure. Therefore, the present disclosure is not limited to the exemplary embodiments. Various modifications and changes can be made by those skilled in the art to which the disclosure pertains from this description. Therefore, the spirit of the present disclosure should not be limited to the above-described exemplary embodiments, and the following claims as well as all technical spirits modified equally or equivalently to the claims should be interpreted to fall within the scope and spirit of the disclosure.

What is claimed is:
1. A non-destructive testing device, comprising:
a tubular housing including a proximal end and a distal end, including:
a conduit section arranged at the proximal end; and
a bendable articulation section secured to the conduit section and arranged at the distal end; and
a plurality of actuation systems, each actuation system including:
a control cable extending along the tubular housing and arranged at a respective circumferential position within the bendable articulation section; and
an actuator disposed at the proximal end of the tubular housing and secured to the control cable;

wherein each control cable of the plurality of actuation systems extends within channels formed between an outer wall and an inner wall of the bendable articulation section.

2. The non-destructive testing device of claim 1, wherein each circumferential position of each control cable of the plurality of actuation systems is substantially equally spaced apart circumferentially around the bendable articulation section.

3. The non-destructive testing device of claim 2, wherein each actuator of the plurality of actuation systems is configured to extend or retract the control cable secured to the actuator.

4. The non-destructive testing device of claim 3, wherein each control cable of the plurality of actuation systems is configured to be independently controlled.

5. The non-destructive testing device of claim 1, wherein the plurality of actuation systems includes a first actuation system, a second actuation system, and a third actuation system.

6. The non-destructive testing device of claim 5, wherein the bendable articulation section is configured to bend when only the first actuation system is actuated.

7. The non-destructive testing device of claim 5, wherein the bendable articulation section is configured to bend when only the second actuation system and the third actuation system are actuated in the same direction.

8. The non-destructive testing device of claim 1, wherein each circumferential position of each control cable of the plurality of actuation systems is unequally spaced apart circumferentially around the bendable articulation section.

9. The non-destructive testing device of claim 8, wherein the bendable articulation section is configured to articulate a substantially 360° angle about the conduit section.

10. The non-destructive testing device of claim 1, further comprising:
   a head section coupled to the distal end of the tubular housing; and
   a control unit housing coupled to the proximal end of the tubular housing.

11. The non-destructive testing device of claim 10, wherein each actuator of the plurality of actuation systems is arranged within the control unit housing.

12. A method of articulating a non-destructive testing device, comprising:
   receiving, by a control unit communicatively coupled to a plurality of actuation systems, an actuation command, each of the plurality of actuation systems including:
      a control cable extending along a tubular housing and arranged at a respective circumferential position within the tubular housing; and
      an actuator disposed at the proximal end of the tubular housing and secured to the control cable; and
   actuating the plurality of actuation systems based on the actuation command in order to bend a bendable articulation section of the tubular housing, wherein each actuation system is configured to be independently operable,
   wherein each control cable of the plurality of actuation systems extends within channels formed between an outer wall and an inner wall of the bendable articulation section.

13. The method of claim 12, wherein each circumferential position of each control cable of the plurality of actuation systems is substantially equally spaced apart circumferentially around the bendable articulation section.

14. The method of claim 13, wherein each actuator of the plurality of actuation systems is configured to extend or retract the control cable secured to the actuator.

15. The method of claim 14, wherein each actuator of the plurality of actuation systems includes a force sensor configured to measure the tension of each control cable.

16. The method of claim 15, wherein each control cable is extended or retracted based on the tension of each control cable of the plurality of actuation systems.

17. The method of claim 12, wherein the plurality of actuation systems comprise a first actuation system, a second actuation system, and a third actuation system.

18. The method of claim 17, further comprising:
   actuating the first actuation system to apply tension to a first control cable bends the bendable articulation section in a first direction; and
   actuating the second actuation system and the third actuation system to apply tension to a second control cable and a third control cable bends the bendable articulation section in a second direction, opposite the first direction.

19. The method of claim 18, wherein the bendable articulation section is configured to be actuated 360° about the conduit section.

\* \* \* \* \*